(12) United States Patent  (10) Patent No.: US 8,393,779 B2
Myojo  (45) Date of Patent: Mar. 12, 2013

(54) LAMP AND LIGHTING APPARATUS

(75) Inventor: Minoru Myojo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/393,376

(22) PCT Filed: Jan. 7, 2011

(86) PCT No.: PCT/JP2011/000037
§ 371 (c)(1),
(2), (4) Date: Feb. 29, 2012

(87) PCT Pub. No.: WO2011/138845
PCT Pub. Date: Nov. 10, 2011

(65) Prior Publication Data
US 2012/0313522 A1  Dec. 13, 2012

(30) Foreign Application Priority Data
May 6, 2010 (JP) ................................. 2010-106750

(51) Int. Cl.
*H01R 33/00* (2006.01)
(52) U.S. Cl. ........................................ 362/647; 362/800
(58) Field of Classification Search ................. 362/640, 362/647, 652, 800
See application file for complete search history.

(56) References Cited

U.S. PATENT DOCUMENTS

| 5,461,543 | A | 10/1995 | Sanpei et al. | |
|---|---|---|---|---|
| 5,581,446 | A | 12/1996 | Sanpei et al. | |
| 5,594,625 | A | 1/1997 | Sanpei et al. | |
| 5,602,722 | A | 2/1997 | Sanpei et al. | |
| 5,838,402 | A | 11/1998 | Sanpei et al. | |
| 5,905,551 | A | 5/1999 | Sanpei et al. | |
| 8,047,685 | B2 * | 11/2011 | Wu et al. | 362/277 |
| 2004/0037088 | A1 * | 2/2004 | English et al. | 362/545 |
| 2010/0097821 | A1 * | 4/2010 | Huang et al. | 362/555 |

FOREIGN PATENT DOCUMENTS

| JP | 6-112665 | 4/1994 |
|---|---|---|
| JP | 2003-086002 | 3/2003 |
| JP | 2005-108642 | 4/2005 |

* cited by examiner

*Primary Examiner* — Thuy Vinh Tran
(74) *Attorney, Agent, or Firm* — Greenblum & Bernstein P.L.C.

(57) ABSTRACT

Generally, existing LED lamps often use robust metallic cases since each of the cases functions as a heat sink. Various shapes for increasing the heat dissipation properties of the case have been employed; there is no unified shape. Existing LED lamps therefore have a problem that they cannot be easily disassembled at the time of recycling. Thus, an object is to provide a lamp which can be easily disassembled at the time of recycling. A lamp includes: a case having a certain shape; an LED module including a semiconductor light-emitting device; and a power supply circuit provided inside the case, for driving the semiconductor light-emitting device to emit light, wherein on an outer side of the case, a step for splitting the case is formed.

16 Claims, 17 Drawing Sheets

LAMP AND LIGHTING APPARATUS

TECHNICAL FIELD

The present invention relates to lamps and lighting apparatuses, and particularly relates to a lamp and a lighting apparatus, each of which includes a light source having a semiconductor light-emitting device.

BACKGROUND ART

In recent years, lamps including semiconductor light-emitting devices such as Light-Emitting Diodes (LEDs) (hereinafter referred to as "LED lamps") have been increasingly used as lamps which would replace existing incandescent lamp bulbs or halogen lamp bulbs since these LED lamps have higher efficiency and longer operating life than the incandescent lamp bulbs or halogen lamp bulbs. In such a situation, more LED lamps are expected to be discarded in the future, and it is therefore important to efficiently recycle various resources included in the LED lamps.

For example, it is preferable to collect and recycle rare metals, such as gold or platinum, or heavy metals, such as gallium, included in components of the LED lamps. Since the LED lamps use a larger number of components than the existing incandescent lamp bulbs or halogen lamp bulbs, the effect of recycling of the LED lamps is high.

In order to efficiently recycle the LED lamps, the components included in the LED lamps need to be taken out. It is therefore preferred that the LED lamps can be relatively easily disassembled at the time of recycling.

In the field of general home appliances, various techniques for facilitating the disassembling at the time of recycling have been proposed (see PTL 1, for example). PTL 1 discloses a technique which facilitates the disassembling by using an engaging claw and a smaller number of screws.

CITATION LIST

Patent Literature

[PTL 1]
Japanese Unexamined Patent Application Publication No. H6-112665

SUMMARY OF INVENTION

Technical Problem

Generally, existing LED lamps often use robust metallic cases since each of the cases functions as a heat sink. For the shape of the case, various shapes for increasing the heat dissipation properties have been employed; there is no unified shape. The existing LED lamps therefore have a problem that they cannot be easily disassembled at the time of recycling.

Thus, the present invention has been devised in view of the above problem and has an object to provide a lamp which can be easily disassembled at the time recycling.

Solution to Problem

In order to achieve the above object, a lamp according to an aspect of the present invention comprises: a case having a certain shape; a light source including a semiconductor light-emitting device; and a lighting circuit provided inside the case, for driving the semiconductor light-emitting device to emit light, wherein on an outer side of the case, a step for splitting the case is formed.

With the step for splitting the case as above, a recycling manufacturer can easily split the case and thereby disassemble the lamp.

Furthermore, it is preferable that the step be a through groove, and the lamp further comprise a split member joined to both sides of the through groove and embedded in the through groove in such a way as to allow the split member to be pulled out.

This allows a recycling manufacturer to split the case by pulling out the split member from the through groove, i.e., without using cutting tools, which further facilitates the disassembling of the lamp.

Furthermore, it is preferable that the lamp further comprise a pullout member connected to an end of the split member, for pulling out the split member from the through groove.

This allows the split member to be pulled out from the through groove by pulling out the pullout member, which further facilitates the disassembling of the lamp.

Furthermore, it is preferable that the pullout member be embedded in the through groove, and the pullout member have a hole formed in a groove direction of the through groove.

This allows the pullout member to be pulled out using a hole formed in the pullout member, which further facilitates the disassembling of the lamp. Furthermore, since the pullout member is embedded in the through groove, the pullout member can be prevented from being too easily pulled out or unintentionally pulled out (for example, being caught on something), with the result that the case can be prevented from being split at times other than the time of recycling.

Furthermore, it is preferable that the through groove include a first groove portion and a second groove portion formed on a bottom of the first groove portion, the second groove portion having a groove width narrower than a groove width of the first groove portion, the split member be embedded at least in the second groove portion, and the pullout member be embedded in the first groove portion.

With this, since the pullout member is embedded in the first groove portion, the pullout member can be prevented from being too easily pulled out or unintentionally pulled out (for example, being caught on something), with the result that the case can be prevented from being split at times other than the time of recycling.

Furthermore, it is preferable that the case further include an intersecting groove which intersects the through groove, and the pullout member be embedded in the intersecting groove.

This allows the pullout member to be prevented from being too easily pulled out or unintentionally pulled out (for example, being caught on something), with the result that the case can be prevented from being split at times other than the time of recycling.

Furthermore, it is preferable that the pullout member have a hole formed in a groove direction of the intersecting groove.

This allows the pullout member to be pulled out using a hole formed in the pullout member, which further facilitates the disassembling of the lamp.

Furthermore, it is preferable that the lamp further comprise a cover member provided so as to cover an opening of the intersecting groove.

With this, the pullout member for pulling out the split member from the through groove is concealed, with the result that the case can be prevented from being split by a user pulling the pullout member too easily.

Furthermore, it is preferable that the cover member be formed by coating the intersecting groove with metal powder.

This allows the pullout member to be easily concealed.

Furthermore, it is preferable that the lamp further comprise: a power supply line disposed inside the case, for supplying power to the semiconductor light-emitting device; and a disconnecting unit configured to cut the power supply line when the split member is pulled out.

With this, the splitting of the case by the split member accompanies the cutting of the power supply line, which prevents the lamp from being used after the case is split and thereby allows improvement in safety.

Furthermore, it is preferable that the disconnecting unit include: a blade member attachment connected to the split member; and a blade member having a blade shape attached to the blade member attachment, and the power supply line be disposed so as to pass between the split member and the blade member.

With this, the power supply line can be cut by a blade member.

Furthermore, it is preferable that the lamp further comprise a regulating unit configured to prevent the power supply line from moving toward the blade member.

This allows the power supply line to be prevented from being cut by the blade member at times other than splitting of the case.

Furthermore, it is preferable that the step include: a first groove portion formed over an entire circumference of the outer side of the case; and a second groove portion having a groove width narrower than a groove width of the first groove portion, the second groove portion being formed partially on a bottom of the first groove portion in a circumferential direction of the first groove portion.

This makes it possible to split the case by relatively small external force after a part of the first groove portion in which the second groove portion is not formed is cut using a cutting tool or the like.

Furthermore, it is preferable that the step be formed in a circumferential direction of the case.

With this, the dissembling of the split case becomes easier.

Furthermore, it is preferable that the case be made of a metal.

With this, the heat inside can be efficiently dissipated through the case.

Furthermore, in order to achieve the above object, a lighting apparatus according to an aspect of the present invention comprises: the above lamp; and a holding unit configured to hold the lamp.

With this, it is possible to produce the same or like effects as the above lamp.

Advantageous Effects of Invention

As is clear from the above descriptions, the lamp or the lighting apparatus according to an aspect of the present invention includes a step for splitting the lamp, with the result that a recycling manufacturer can easily split the case and thereby disassemble the lamp.

DESCRIPTION OF EMBODIMENTS

Embodiments of the present invention are described below with reference to the drawings.

Embodiment 1

Figure 1:
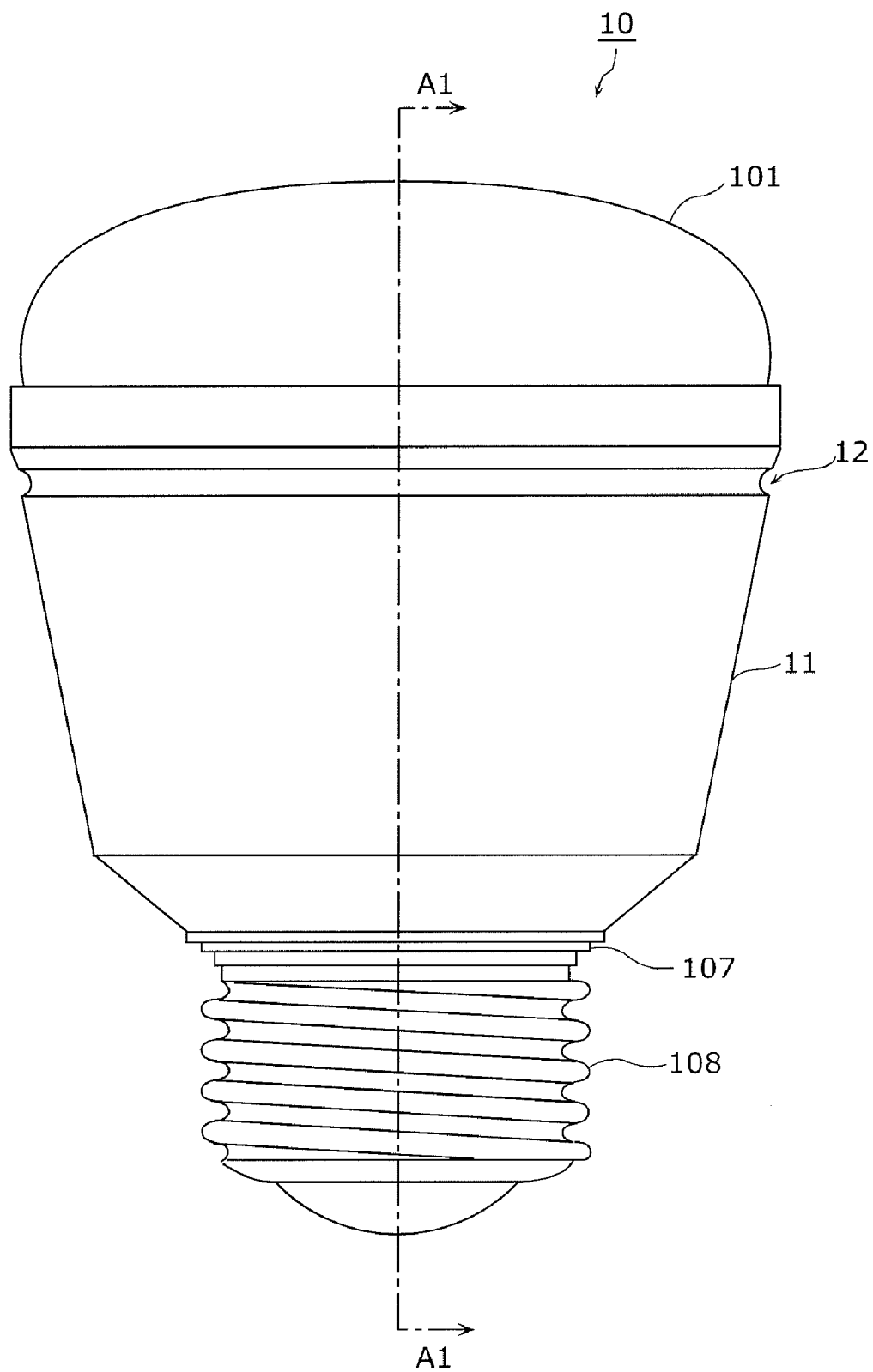
FIG. 1 is a front elevational view of a lamp according to Embodiment 1 of the present invention.
Figure 2:
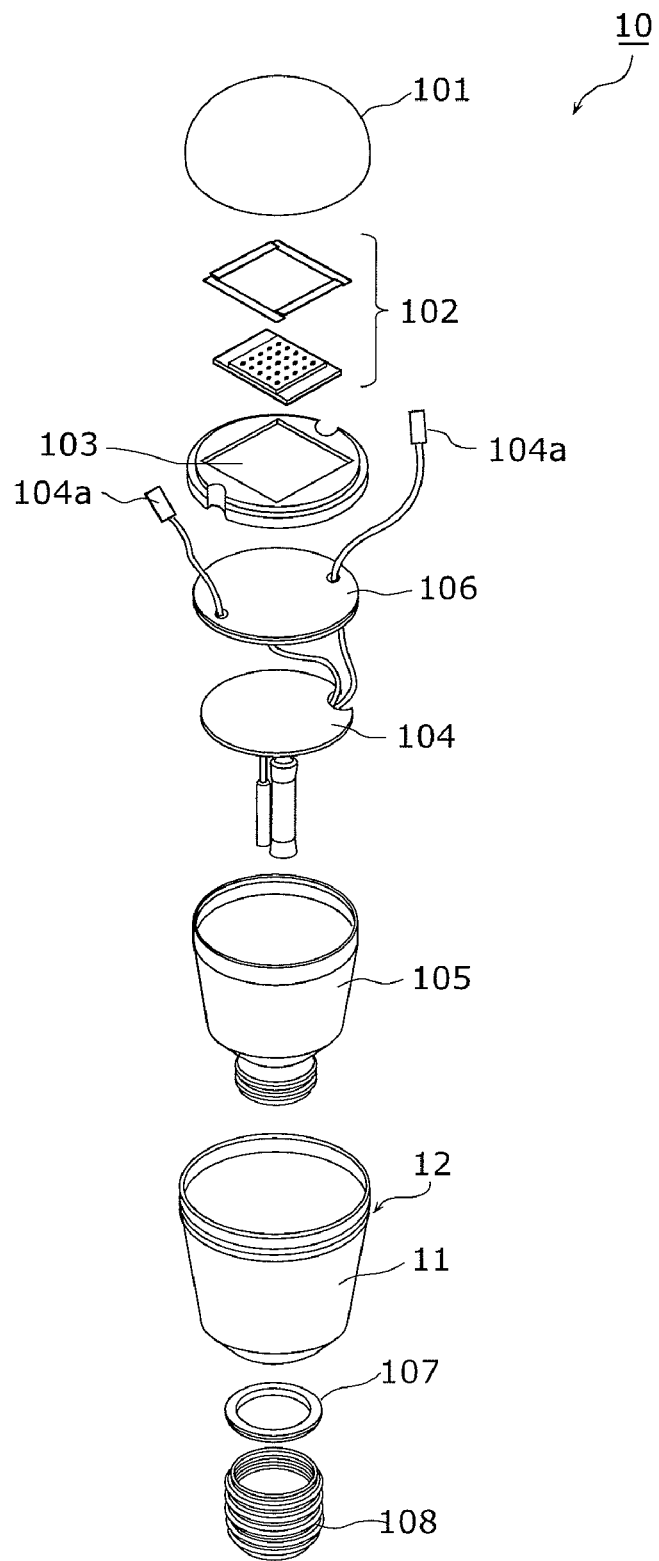
FIG. 2 is an exploded perspective view of the lamp according to Embodiment 1 of the present invention.
Figure 3:
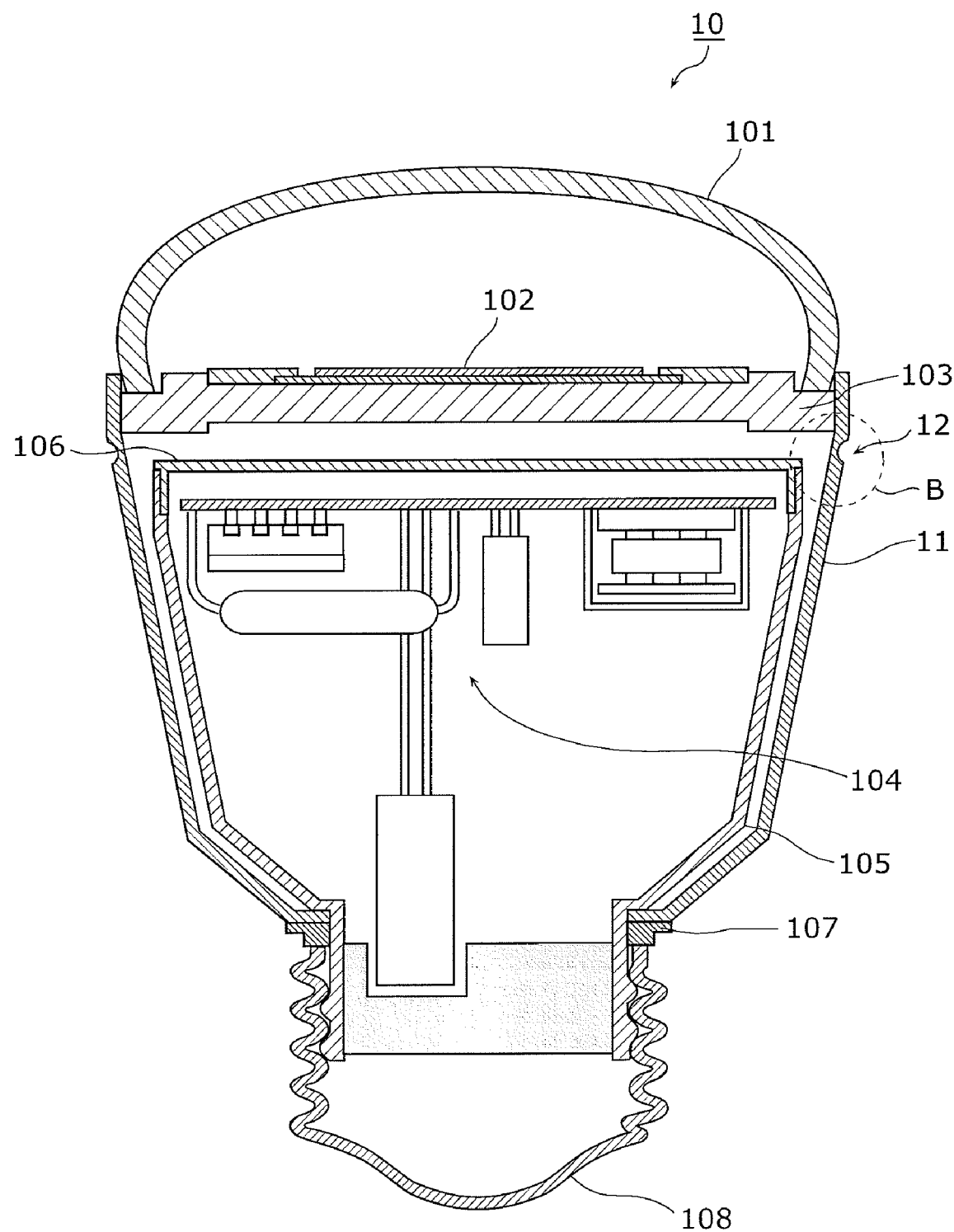
FIG. 3 is a cross-sectional view of the lamp according to Embodiment 1 of the present invention.

With reference to FIGS. 1 to 3, the overall structure of a lamp 10 according to Embodiment 1 of the present invention is described. FIG. 1 is a front elevational view of the lamp according to Embodiment 1 of the present invention. FIG. 2 is an exploded perspective view of the lamp according to Embodiment 1 of the present invention. FIG. 3 is a cross-sectional view of the lamp according to Embodiment 1 of the present invention. Specifically, FIG. 3 is a cross-sectional view taken along line A1-A1 of FIG. 1.

As shown in FIGS. 1 to 3, the lamp 10 according to this embodiment is a bulb-shaped LED lamp. The lamp 10 includes a globe 101, an LED module 102, an LED module holder 103, a power supply circuit 104, a resin case 105, a resin cap 106, an insulating ring 107, a base 108, and a case 11.

The globe 101 is a hemispherical light-transmissive cover for radiating light from the LED module 102 to outside of the lamp. The globe 101 is made of a glass material to which light diffusion treatment such as frosted-glass treatment has been imparted so as to spread the light emitted from the LED module 102. An edge of an opening of the globe 101 is placed in contact with the upper surface of the LED holder 103. The globe 101 is bonded to the case 11 by heat-resistant silicon adhesive.

It is to be noted that the shape of the globe 101 is not limited to a hemispherical shape and may be a spheroid shape or an oblate spheroid shape. In addition, the material of the globe 101 is a glass material in this embodiment, but the material of the group 101 is not limited to the glass material and may be synthetic resin or other material.

The LED module 102 is a light source which emits illumination light of a predetermined color. The LED module 102 includes a substrate and a plurality of LED chips (semiconductor light-emitting devices) mounted on the substrate. The LED chips often use gallium-based semiconductors such as gallium arsenide (GaAs)-based or gallium phosphide (GaP)-based semiconductors.

The LED module holder 103 is a holder (a module plate) composed of a metal substrate for holding the LED module 102. In this embodiment, the LED module holder 103 is a disc-shaped member fabricated by aluminum die casting. It is to be noted that the LED module holder 103 has a notch for the passage of a power supply line 104a by which the power supply circuit 104 and the LED module 102 are electrically connected.

The power supply circuit 104 corresponds to a lighting circuit for driving the semiconductor light-emitting device to emit light. Specifically, the power supply circuit 104 includes: a plurality of circuit devices which compose a circuit for driving LED chips of the LED module 102 to emit light; and a circuit board on which the circuit devices are mounted. The power supply circuit 104 converts alternating-current (AC) power received from the base 108 into direct-current (DC) power and supplies the DC power to the LED chips of the LED module 102 through the power supply line 104a.

The resin case 105 is a case for housing the power supply circuit 104. Furthermore, the resin case 105 has a shape which is substantially identical to the shape of the case 11. The resin case 105 is disposed so that there is a gap between the resin case 105 and the case 11.

The resin cap 106 is a substantially disc-shaped lid for covering an upper opening of the resin case 105. The resin cap 106 has a through hole for the passage of the power supply line 104a.

The insulating ring 107 is a member for providing insulation between the base 108 and the case 11 and is located between the base 108 and the case 11. The inner circumferential surface of the insulting ring 107 is in contact with the outer circumferential surface of a lower part of the resin case 105. With the resin case 105 and the base 108 attached by screwing, the insulating ring 107 is clasped between an edge of an opening of the base 108 and an edge of an opening of the case 11.

The base 108 is a power receiving unit for receiving AC power through two contacts. The power received by the base 108 is input to a power input unit of the power supply circuit 104 through a power supply line (not shown).

The case 11 is a tubular member with two openings in the vertical direction. Furthermore, the case 11 is a metallic member. In this embodiment, the case 11 is made of an aluminum alloy material. This case 11 functions as a heat sink which dissipates, to outside, heat generated from the LED module 102. Thus, the case 11 has a surface treated with alumite in order to improve a thermal emittance.

Furthermore, the case 11 has, on the outer side, a groove 12 for splitting the case 11. This groove 12 is an example of the step. Here, splitting means dividing the case 11 into two or more parts. It is to be noted that the two or more parts resulting from the splitting do not always need to be completely separated off and may be partially connected.

In this embodiment, the groove 12 is formed over the entire circumference of the case 11. Furthermore, the groove 12 is formed between the LED module 102 and the power supply circuit 104.

It is to be noted that the groove 12 does not always need to be formed over the entire circumference of the case 11. The groove 12 may be formed in a part of the case 11. Specifically, it is preferable that the groove 12 be formed 180 degrees or more in the circumferential direction of the case 11. This allows a recycling manufacturer to split the case 11 by applying thereto relatively small vertical external force with a hand, a machine, or the like after the part with the groove 12 is cut.

Furthermore, it is preferable that a thickness of the case 11 in a region where the groove 12 is formed be uniform in the circumferential direction. This allows a recycling manufacturer to easily split the case from any position in the circumferential direction in which the groove 12 is formed.

Figure 4:
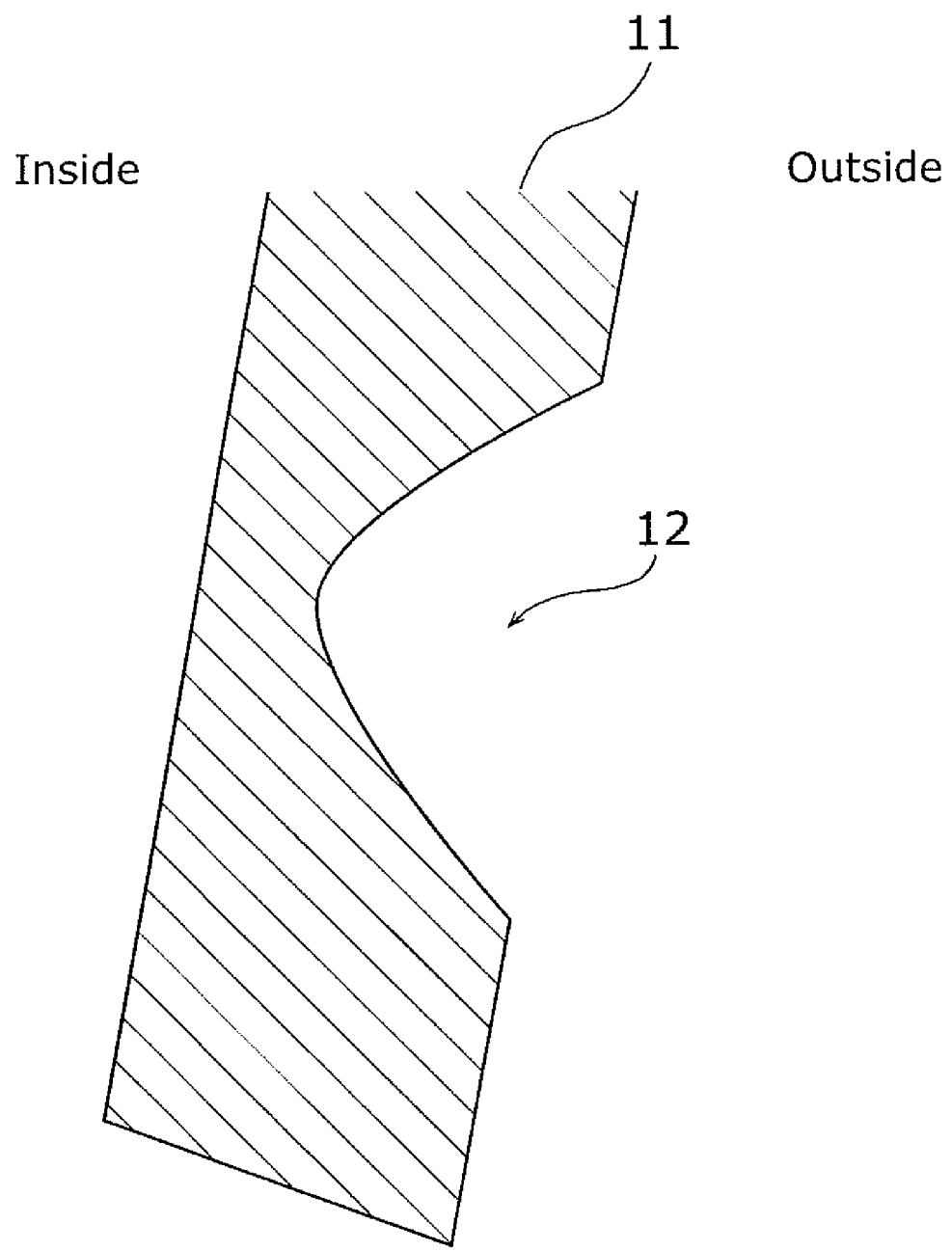
FIG. 4 is an expanded cross-sectional view of a groove formed in the lamp according to Embodiment 1 of the present invention.

FIG. 4 is an expanded cross-sectional view of a groove formed in the lamp according to Embodiment 1 of the present invention. Specifically, FIG. 4 is an expanded view of a region B shown in FIG. 3.

As shown in FIG. 4, the groove 12 has an arc-shaped cross section. The case 11 has a smaller thickness in the region where the groove 12 is formed than in the region near the groove 12, that is, the region where the groove 12 is not formed.

It is to be noted that the groove 12 does not always need to have an arc-shaped cross section. For example, the groove 12 may have a triangular or rectangular cross section.

Furthermore, it is preferable that, of the case 11, the thickness of at least a part of the region where the groove 12 is formed be half or less than half of the thickness in the nearby region where the groove 12 is not formed. This allows a recycling manufacturer to more easily split the case 11 by cutting the bottom of the groove 12.

Next, a disassembling method for the lamp 10 configured as above is described.

Figure 5:
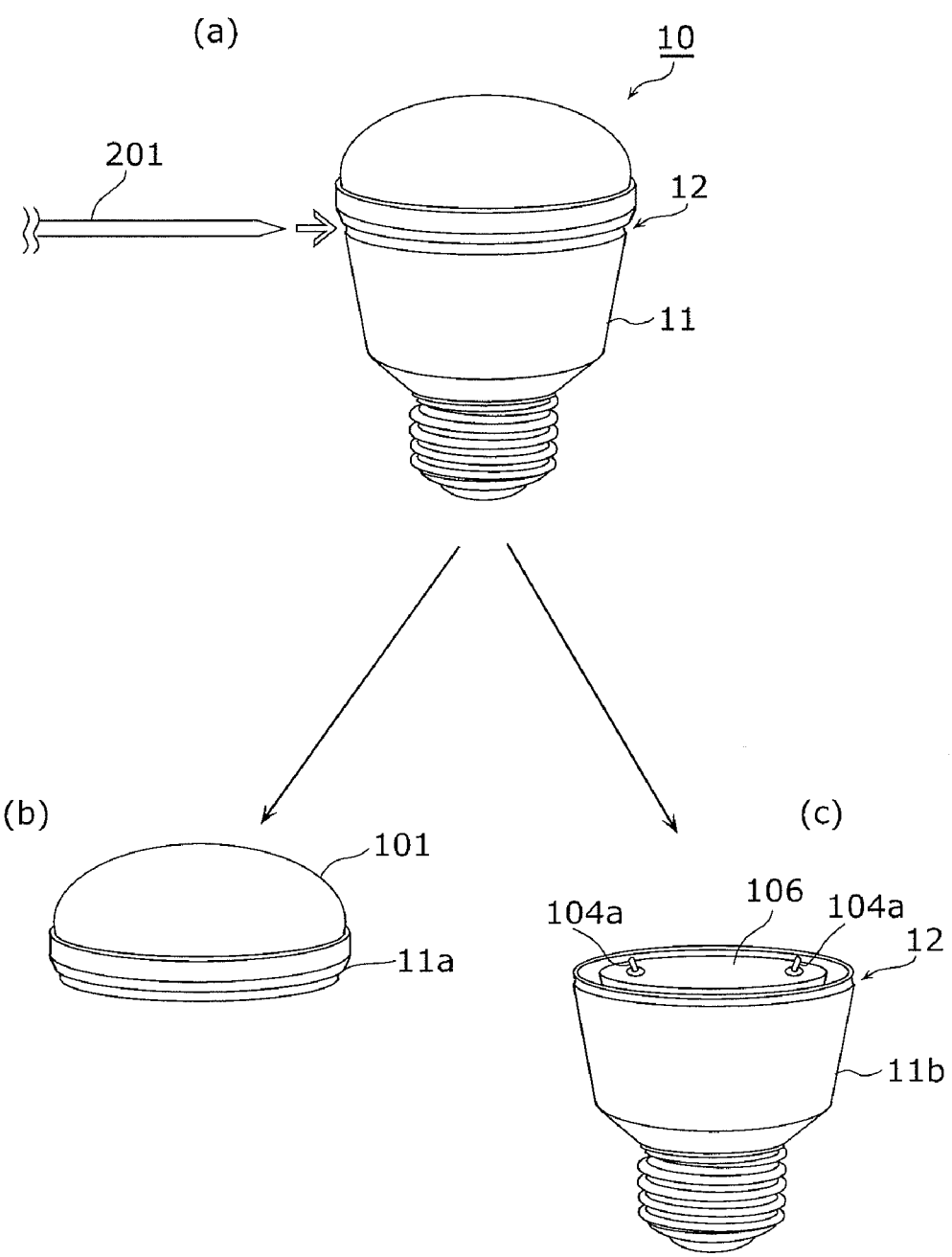
FIG. 5 illustrates an example of a disassembling method for the lamp according to Embodiment 1 of the present invention.

FIG. 5 illustrates an example of a disassembling method for the lamp according to Embodiment 1 of the present invention.

As shown in (a) of FIG. 5, a recycling manufacturer cuts the case 11 at the position of the groove 12, for example, using a cutter 201 such as a laser cutter or a saw. As a result, the lamp 10 is split into an upper part and a lower part as shown in (b) and (c) of FIG. 5.

At this time, the LED module 102 is included in an upper case 11a shown in (b) of FIG. 5 while the power supply circuit 104 is included in a lower case 11b shown in (c) of FIG. 5. This means that the lamp 10 is split into the upper part and the lower part in such a way that the LED module 102 and the power supply circuit 104 are not significantly damaged. In addition, since the power supply line 104a intersects with the groove 12 formed in the circumferential direction, the cutting of the case 11 accompanies the cutting of the power supply line 104a, as shown in (c) of FIG. 5.

From the lamp 10 split into the upper part and the lower part as above, the recycling manufacturer then takes out the LED module 102 and the power supply circuit 104 to disassemble the lamp 10. For example, the recycling manufacturer physically destroys the globe 101 to take out the LED module 102. Alternatively, for example, the recycling manufacturer detaches the resin cap 106 to take out the LED module 102 provided inside the resin case 105. Moreover, the recycling manufacturer detaches the resin case 105, the insulating ring 107, and the base 108 from the case 11.

As above, since the lamp 10 according to this embodiment has the groove 12 for splitting the case 11, a recycling manufacturer can easily split the case by cutting the thin part of the case 11 where the groove 12 is formed, to disassemble the lamp.

Furthermore, in the case where the case 11 is cut using a cutting tool having a blade, a recycling manufacturer can insert the blade to the groove to cut the case 11, which means that it is easy to position the blade in the cutting process, with the result that the case 11 can be easily cut.

Although the groove 12 is formed on the outer side of the case 11 in this embodiment, the groove 12 does not always need to be formed. For example, the outer side of the case 11 may be formed to have a stair-like shape. Specifically, it is sufficient that the outer side of the case 11 has a step for splitting the case 11. With this, in the case of cutting the case 11 using a cutting tool having a blade, a recycling manufacturer can position the blade using the step and thereby easily cut the case 11. This means that the recycling manufacturer can easily split the case to disassemble the lamp.

Embodiment 2

Next, Embodiment 2 of the present invention is described.

A lamp 20 according to this embodiment is the same as the lamp 10 according to Embodiment 1 except that the groove has a different shape. Accordingly, the following describes the lamp 20, mainly the shape of the groove, according to this embodiment.

Figure 6:
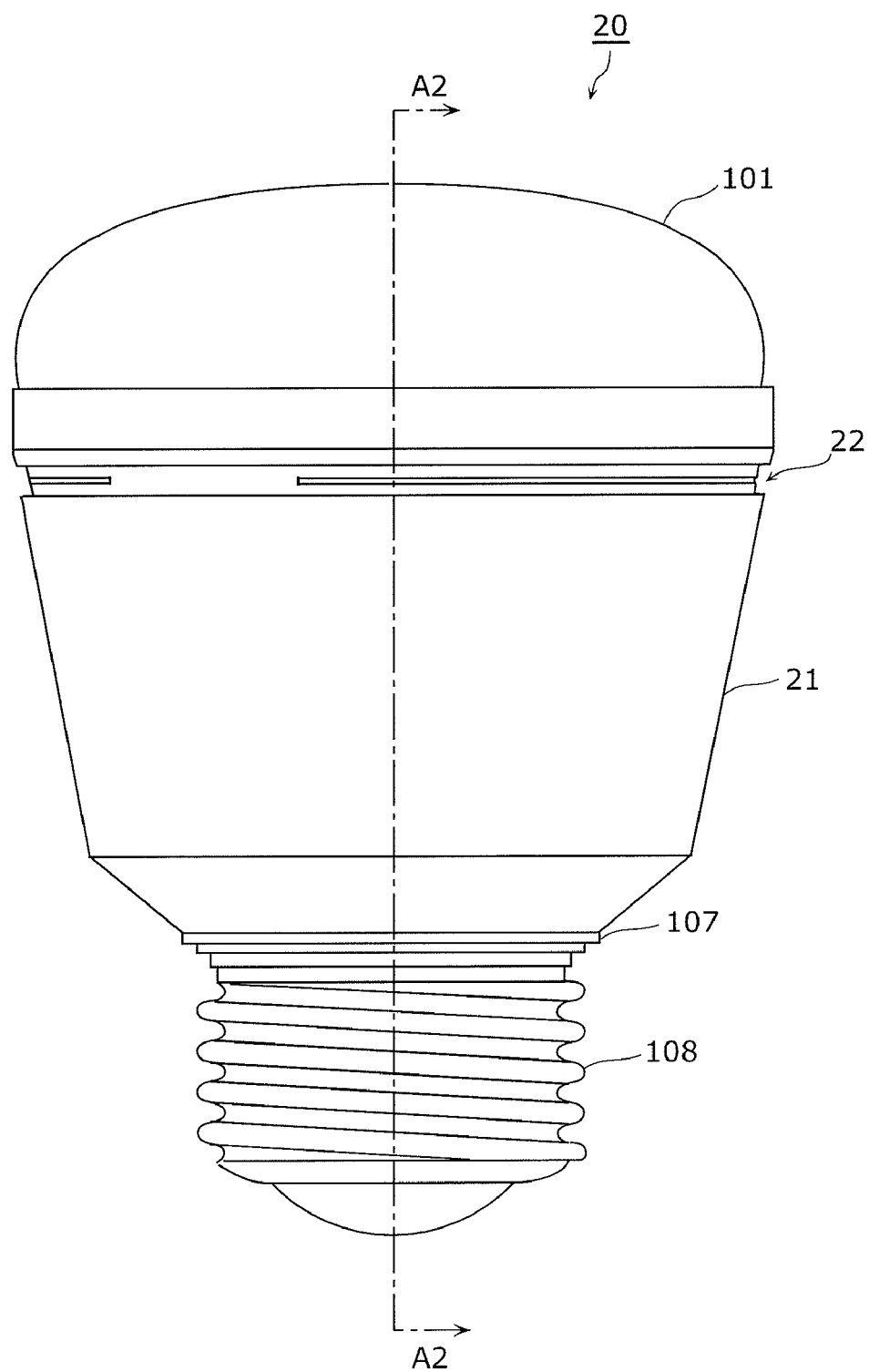
FIG. 6 is a front elevational view of a lamp according to Embodiment 2 of the present invention.

FIG. 6 is a front elevational view of the lamp according to Embodiment 2 of the present invention. In FIG. 6, constituents which are the same or like as those in FIG. 1 are denoted by the same numerals and are not described.

On a case 21, a groove 22 which is different in shape from the groove 12 according to Embodiment 1 is formed at a position which is the same or like as that of the case 11 according to Embodiment 1.

Figure 7:
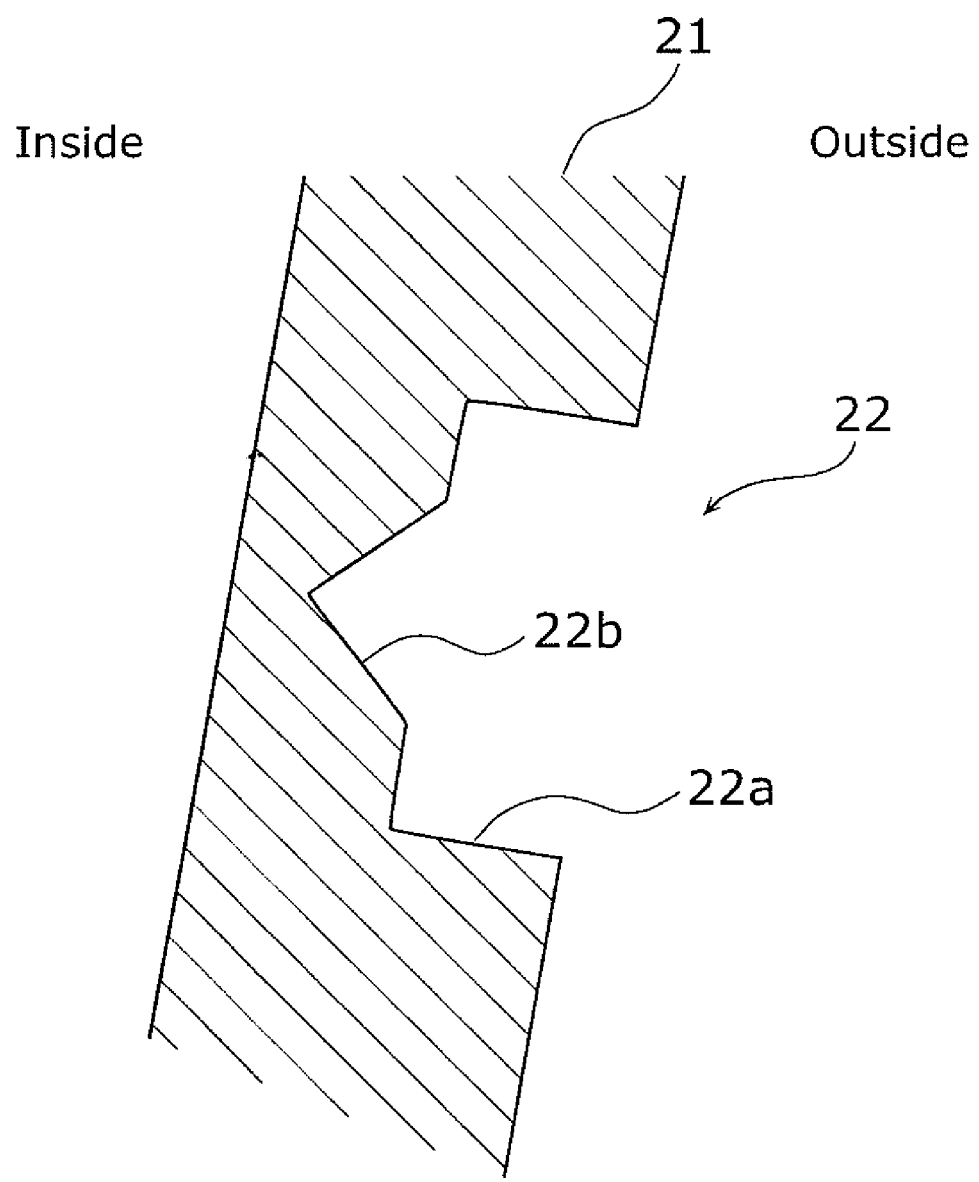
FIG. 7 is an expanded cross-sectional view of a groove formed in the lamp according to Embodiment 2 of the present invention.

FIG. 7 is an expanded cross-sectional view of the groove formed in the lamp according to Embodiment 2 of the present invention. Specifically, FIG. 7 is an expanded view of the vicinity of the groove taken along line A2-A2 of FIG. 6. As shown in FIG. 7, the groove 22 is formed in the circumferential direction of the case 21 and includes a first groove portion 22a and a second groove portion 22b.

The first groove portion 22a is formed over the entire circumference of the case 21. Furthermore, the first groove portion 22a has a rectangular cross section.

The second groove portion 22b is formed on the bottom of the first groove portion 22a and has a groove width narrower than a groove width of the first groove portion 22a. The second groove portion 22b is formed partially in the circumferential direction of the case 21. Furthermore, the second groove portion 22b has a triangular cross section.

It is to be noted that the cross-sectional shape of the first groove portion 22a and the cross-sectional shape of the second groove portion 22b are not limited to the above shapes. For example, each of the first groove portion 22a and the second groove portion 22b may have an arc-shaped cross section.

Next, a disassembling method for the lamp 20 configured as above is described.

A recycling manufacturer cuts, using a cutter such as a laser cutter or a saw, a part of the first groove portion 22a in which the second groove portion 22b is not formed, for example. The recycling manufacturer then applies force in a direction in which an upper part and a lower part of the lamp 22 are pulled away, to thereby tear the part in which the second groove portion 22b is formed.

Thus, a recycling manufacturer can split the lamp 20 into the upper part and the lower part from the position where the groove 22 is formed. It is to be noted that since the part where the second groove portion 22b is formed is a thin part of the case 21, a recycling manufacturer can tear, by applying relatively small force, the part where the second groove portion 22b is formed.

As above, in the case of the lamp 20 according to this embodiment, the case 21 can be split by relatively small external force after a part of the groove 22 where the second groove part 22b is not formed is cut using a cutting tool or the like. Thus, a recycling manufacturer can easily disassemble the lamp 20.

Embodiment 3

Next, Embodiment 3 of the present invention is described.

A lamp 30 according to this embodiment is the same as the lamp 10 according to Embodiment 1 except that a split member and the like are provided and that the shape of the groove and other matters are different. Accordingly, the following describes the lamp 30 according to this embodiment, mainly differences from the lamp 10 according to Embodiment 1.

Figure 8:
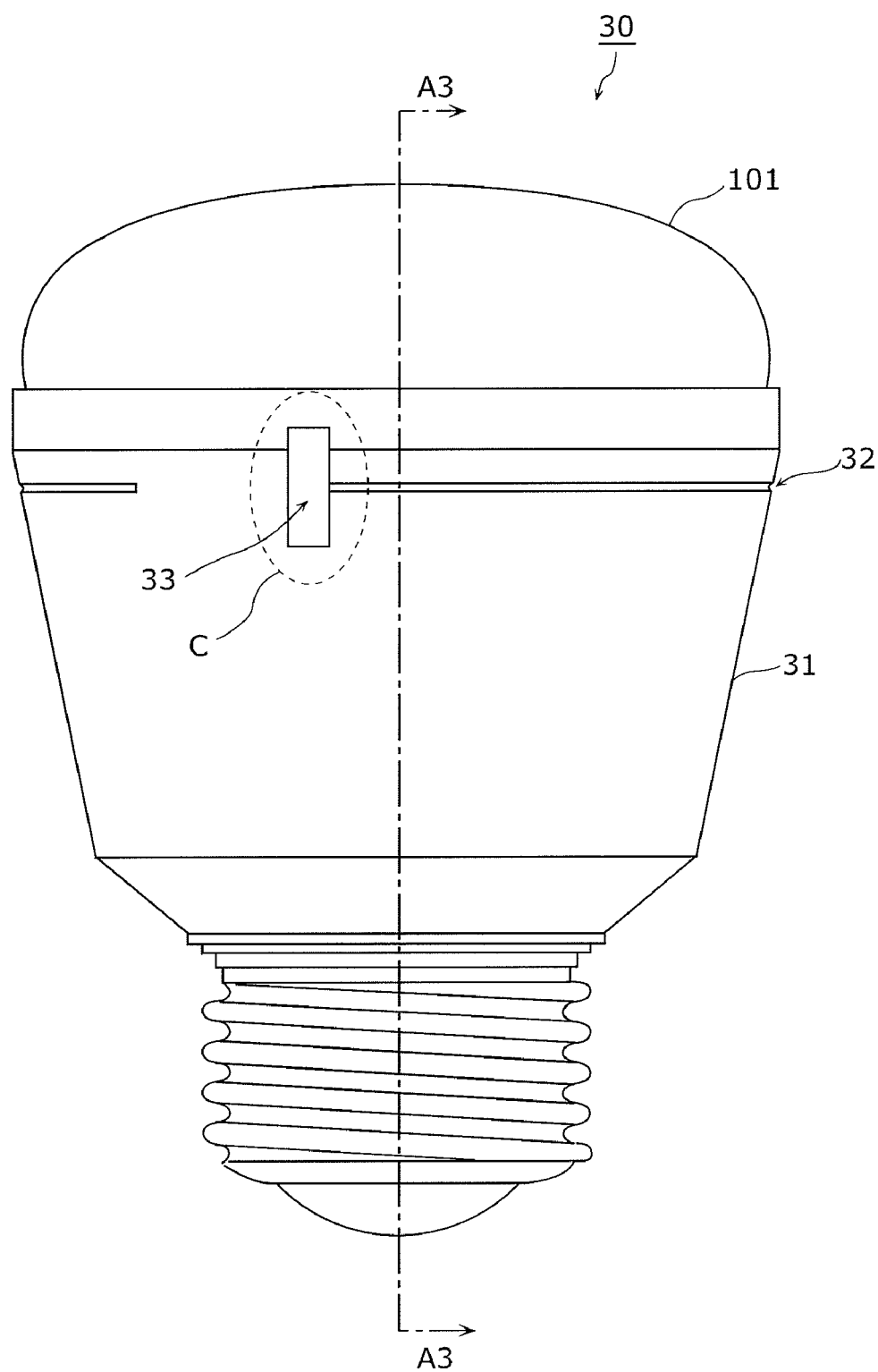
FIG. 8 is a front elevational view of a lamp according to Embodiment 3 of the present invention.

FIG. 8 is a front elevational view of the lamp according to Embodiment 3 of the present invention. In FIG. 8, constituents which are the same or like as those in FIG. 1 are denoted by the same numerals and are not described.

A case 31 has, on the outer side, a groove 32 in the circumferential direction. In this embodiment, the groove 32 is formed below the LED module holder 103.

Furthermore, the outer side of the case 31 has an intersecting groove 33 which intersects the groove 32. In this embodiment, the intersecting groove 33 is formed in the axial direction of the case 31.

Figure 9:
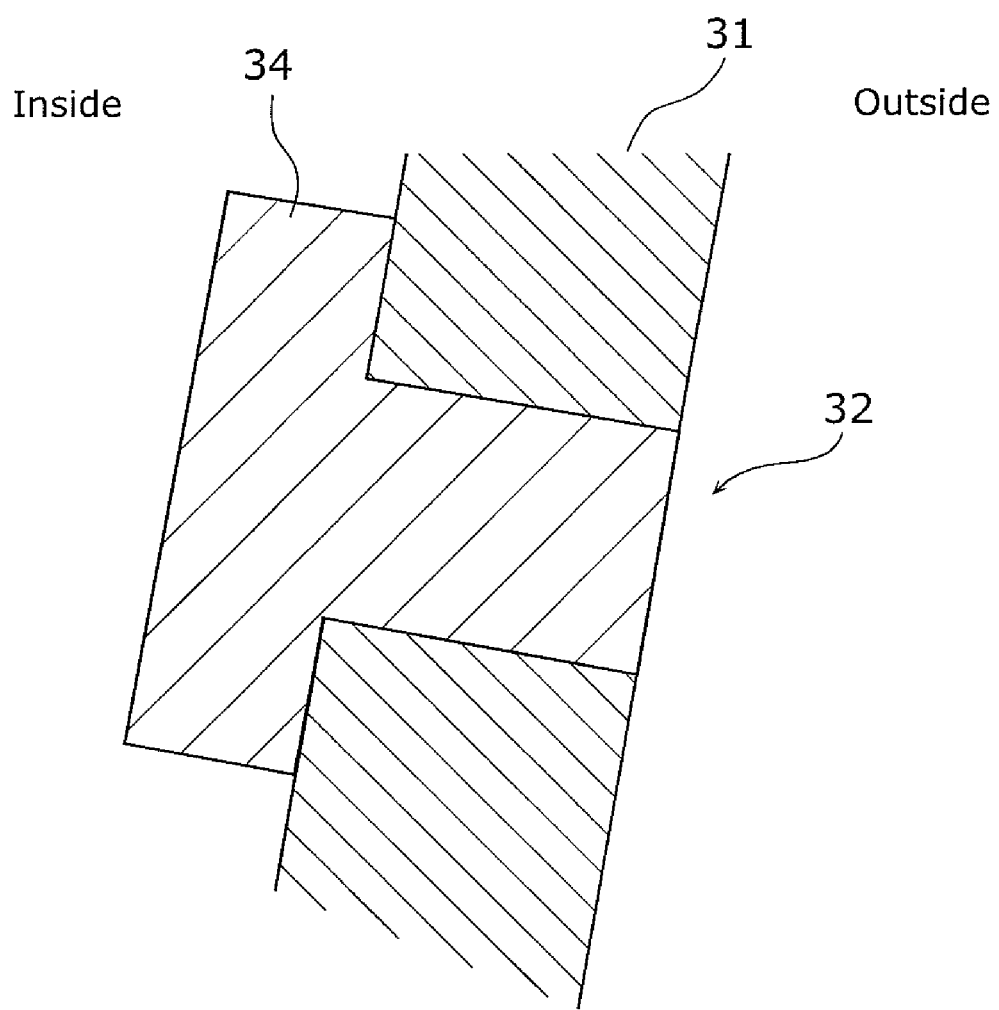
FIG. 9 is an expanded cross-sectional view of a groove formed in the lamp according to Embodiment 3 of the present invention.

FIG. 9 is an expanded cross-sectional view of the groove formed in the lamp according to Embodiment 3 of the present invention. Specifically, FIG. 9 is an expanded view of the vicinity of the groove taken along line A3-A3 of FIG. 8.

As shown in FIG. 9, the groove 32 is a through groove. Furthermore, in the groove 32, a split member 34 is embedded.

The split member 34 is embedded in the groove 32 in such a way that the split member 34 is joined to both sides of the groove 32 and can be pulled out. In this embodiment, the split member 34 is a string member bonded to the both sides of the groove 32 using adhesive or the like. Furthermore, the split member 34 has a convex cross section, and the both sides of the convex portion are joined to the respective sides of the groove 32.

Although the split member 34 preferably has a convex cross section, the cross-sectional shape of the split member 34 does not always need to be convex. For example, the cross-sectional shape of the split member 34 may be a simple rectangle In other words, the cross-sectional shape of the split member 34 may be any shape as long as the split member 34 can be joined to the both sides of the groove 32 and can also be pulled out from the groove 32.

Figure 10:
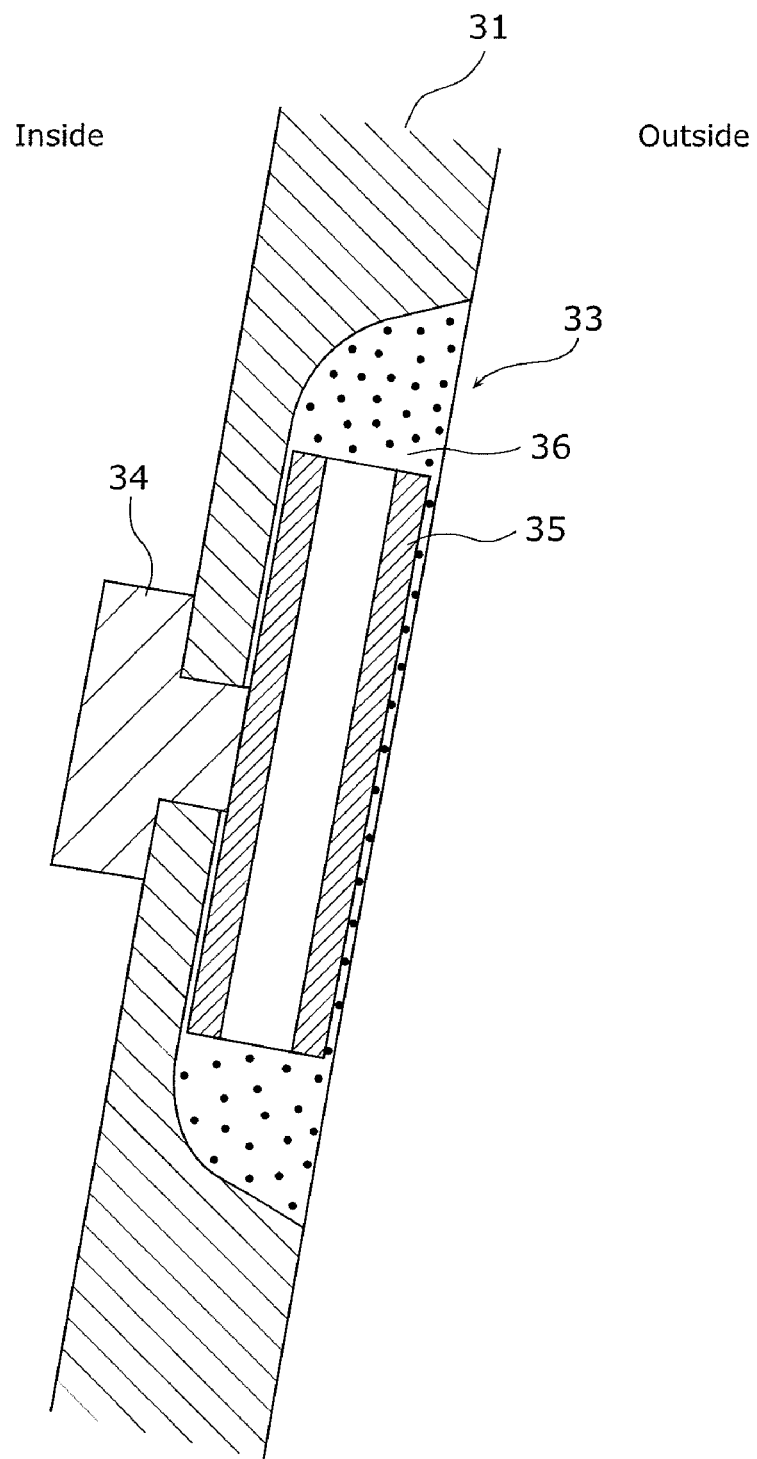
FIG. 10 is an expanded cross-sectional view of an intersecting groove formed in the lamp according to Embodiment 3 of the present invention.
Figure 11:
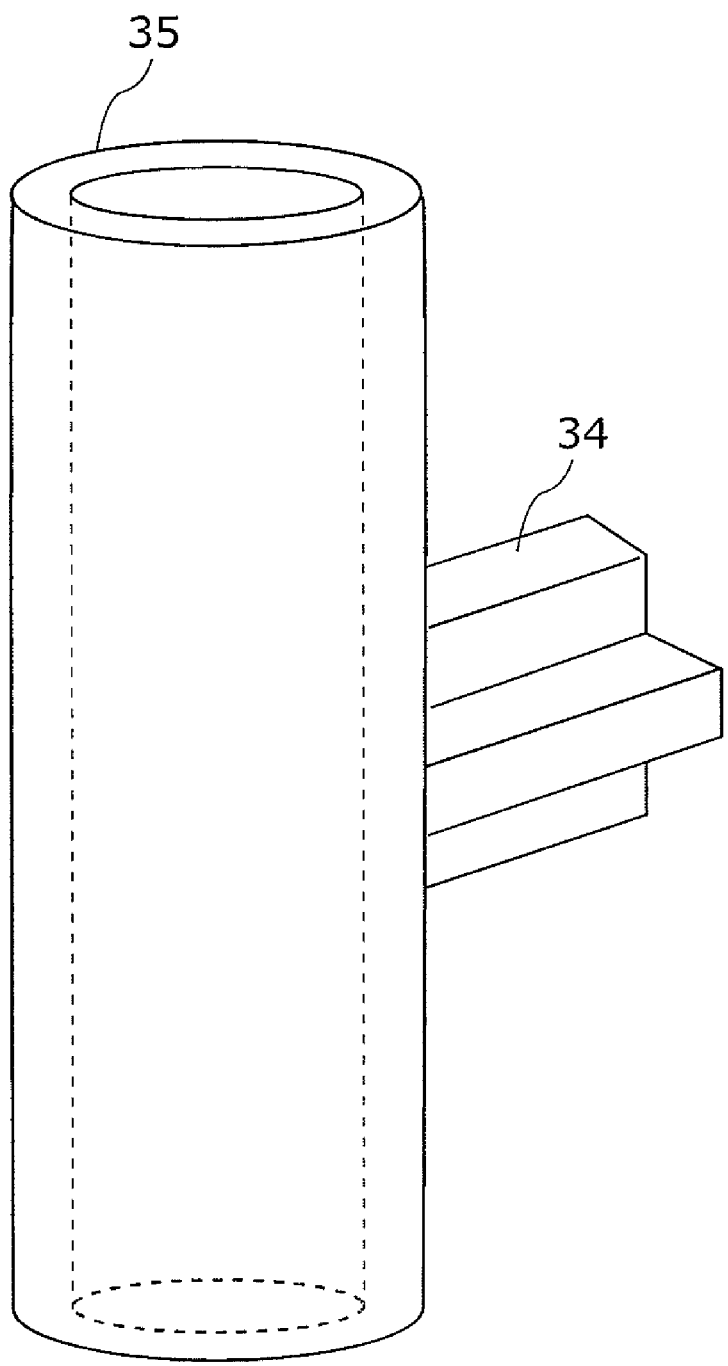
FIG. 11 is a perspective view of a pullout member according to Embodiment 3 of the present invention.

The following describes a pullout member 35 with reference to FIGS. 10 and 11.

FIG. 10 is an expanded cross-sectional view of the intersecting groove formed in the lamp according to Embodiment 3 of the present invention. Specifically, FIG. 10 is an expanded cross-sectional view of a region C shown in FIG. 8.

FIG. 11 is a perspective view of the pullout member according to Embodiment 3 of the present invention.

In the intersecting groove 33, the pullout member 35 is embedded. This pullout member 35 is a member for pulling out the split member 34 from the groove 32. Furthermore, the pullout member 35 is connected to an end of the split member 34.

The pullout member 35 is a tubular member. Specifically, the pullout member 35 has a through hole. This through hole is formed in a groove direction of the intersecting groove 33. Although the pullout member 35 is preferably fully embedded in the intersecting groove 33, but it may be partially embedded in the intersecting groove 33.

Furthermore, the pullout member 35 does not always need to have a tubular shape. For example, the pullout member 35 may have a polygonal tubular shape. In addition, the pullout member 35 does not always need to have a through hole. The pullout member 35 may have any shape that allows a recycling manufacturer to easily pull out the pullout member 35 from the intersecting groove 33. For example, the pullout member 35 may have a non-through hole on at least one end. In this case, a recycling manufacturer can hook a tool in this non-through hole and pull out the pullout member 35 from the intersecting groove 33.

The opening of the intersecting groove 33 is covered by a cover member 36. In other words, the cover member 36 is placed so as to cover the opening of the intersecting groove 33. This cover member 36 is formed by coating the intersecting groove 33 with metal powder, for example.

It is to be noted that the cover member 36 does not always need to be formed by coating the intersecting groove 33 with metal powder. The cover member 36 may be any member that can conceal the pullout member 35 embedded in the intersecting groove 33. For example, the cover member 36 may be a film-shaped member attached to the outer side of the case 31 so as to cover the intersecting groove 33. Furthermore, although the cover member 36 is preferably provided on the lamp 30, but it does not always need to be provided.

Next, a disassembling method for the lamp 30 configured as above is described.

Figure 12:
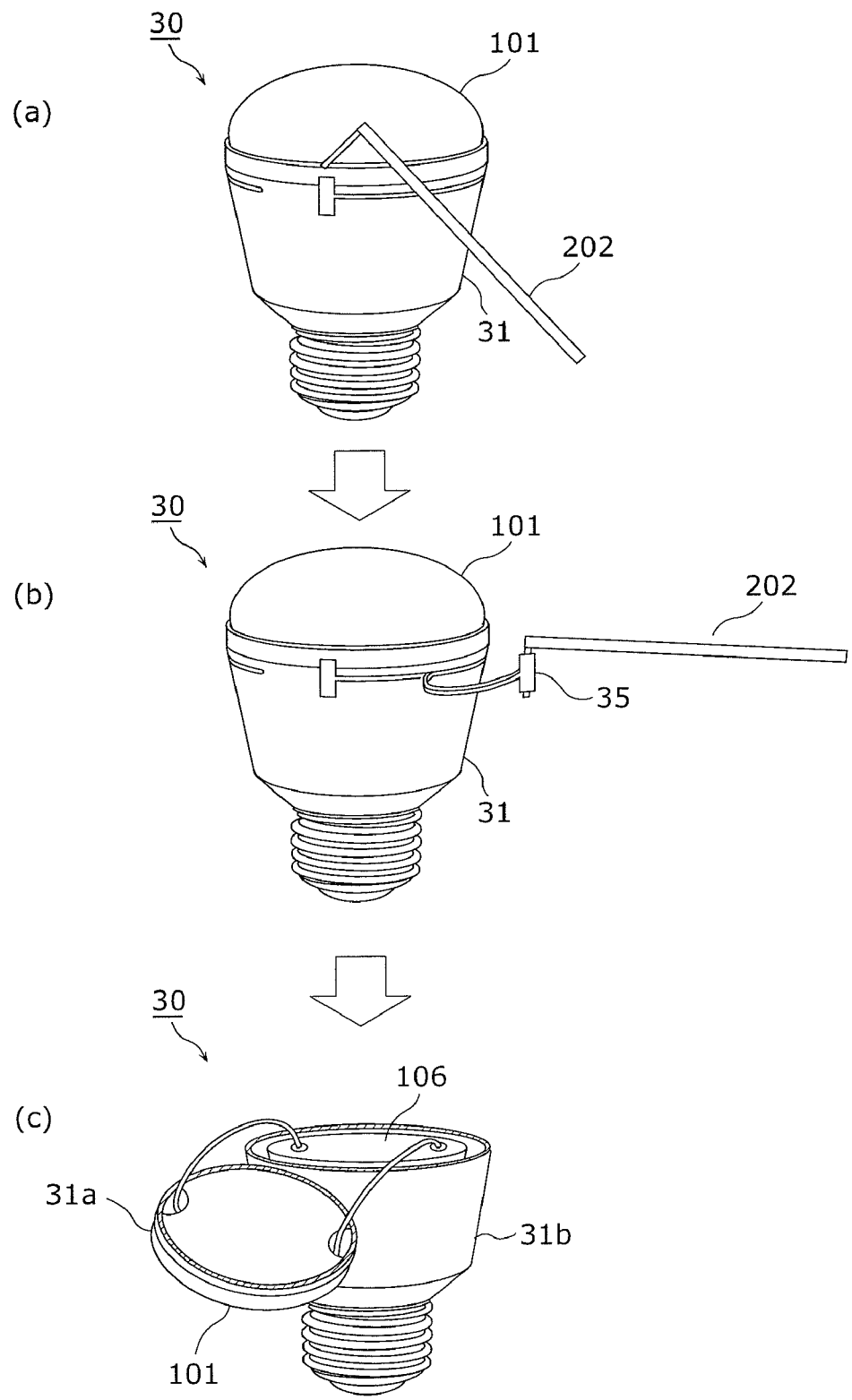
FIG. 12 illustrates an example of a disassembling method for the lamp according to Embodiment 3 of the present invention.

FIG. 12 illustrates an example of the disassembling method for the lamp according to Embodiment 3 of the present invention.

As shown in (a) of FIG. 12, a recycling manufacturer inserts a tool 202 to the through hole of the pullout member 35 embedded in the intersecting groove 33. Subsequently, as shown in (b) of FIG. 12, the recycling manufacturer pulls the tool 202 to pull out the pullout member 35 from the intersecting groove 33 and at the same time, pull out, from the groove 32, the split member physically connected to the pullout member 35.

As shown in (c) of FIG. 12, the recycling manufacturer then pulls out the whole split member 34 from the groove 32, thereby allowing the lamp 30 to be split into the upper part and the lower part.

It is to be noted that the groove 32 is formed below the LED module holder 103. Consequently, the LED module 102 is included in an upper case 31a while the power supply circuit 104 is included in a lower case 31b.

From the lamp 30 split into the upper part and the lower part as above, the recycling manufacturer then takes out the LED module 102 and the power supply circuit 104 to disassemble the lamp 30.

As above, since the lamp 30 according to this embodiment includes the split member 34, a recycling manufacturer can split the case 31 by pulling out the split member 34 from the groove, i.e., without using cutting tools. Thus, a recycling manufacturer can easily disassemble the lamp 30.

Furthermore, since the lamp 30 includes the pullout member 35, a recycling manufacturer can pull out the split member 34 from the groove 32 by pulling out the pullout member 35, which further facilitates the disassembling of the lamp 30.

Furthermore, since the pullout member 35 is embedded in the intersecting groove 33, the pullout member 35 can be prevented from being too easily pulled out by a user or unintentionally pulled out (for example, being caught on something), with the result that the case 31 can be prevented from being split at times other than the time of recycling.

Furthermore, since the pullout member 35 has a hole, a recycling manufacturer can pull out the pullout member 35 by using the hole, which further facilitates the disassembling of the lamp 30.

Furthermore, since the lamp 30 includes the cover member 36 formed by metal powder coating, the pullout member 35 is concealed. This allows the case 31 to be prevented from being split by a user pulling the pullout member 35.

Embodiment 4

Next, Embodiment 4 of the present invention is described.

A lamp 40 according to this embodiment includes a split member and a pullout member as in the case of the lamp 30 according to Embodiment 3. However, the groove and the pullout member of the lamp 40 are different from the groove and the pullout member of the lamp 30. Accordingly, the following describes the lamp 40 according to this embodiment, mainly differences from the lamp 30 according to Embodiment 3.

Figure 13:
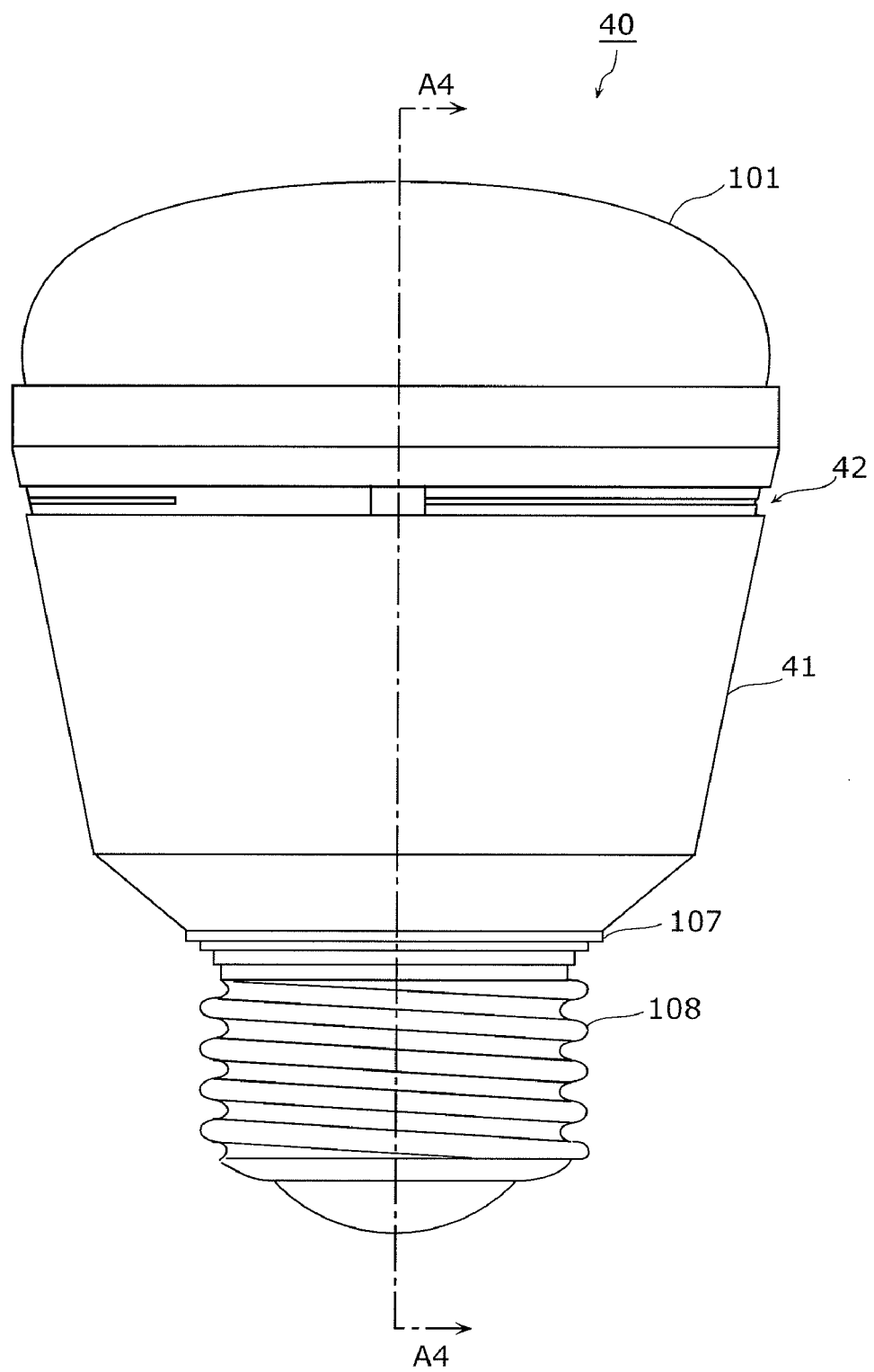
FIG. 13 is a front elevational view of a lamp according to Embodiment 4 of the present invention.
Figure 14:
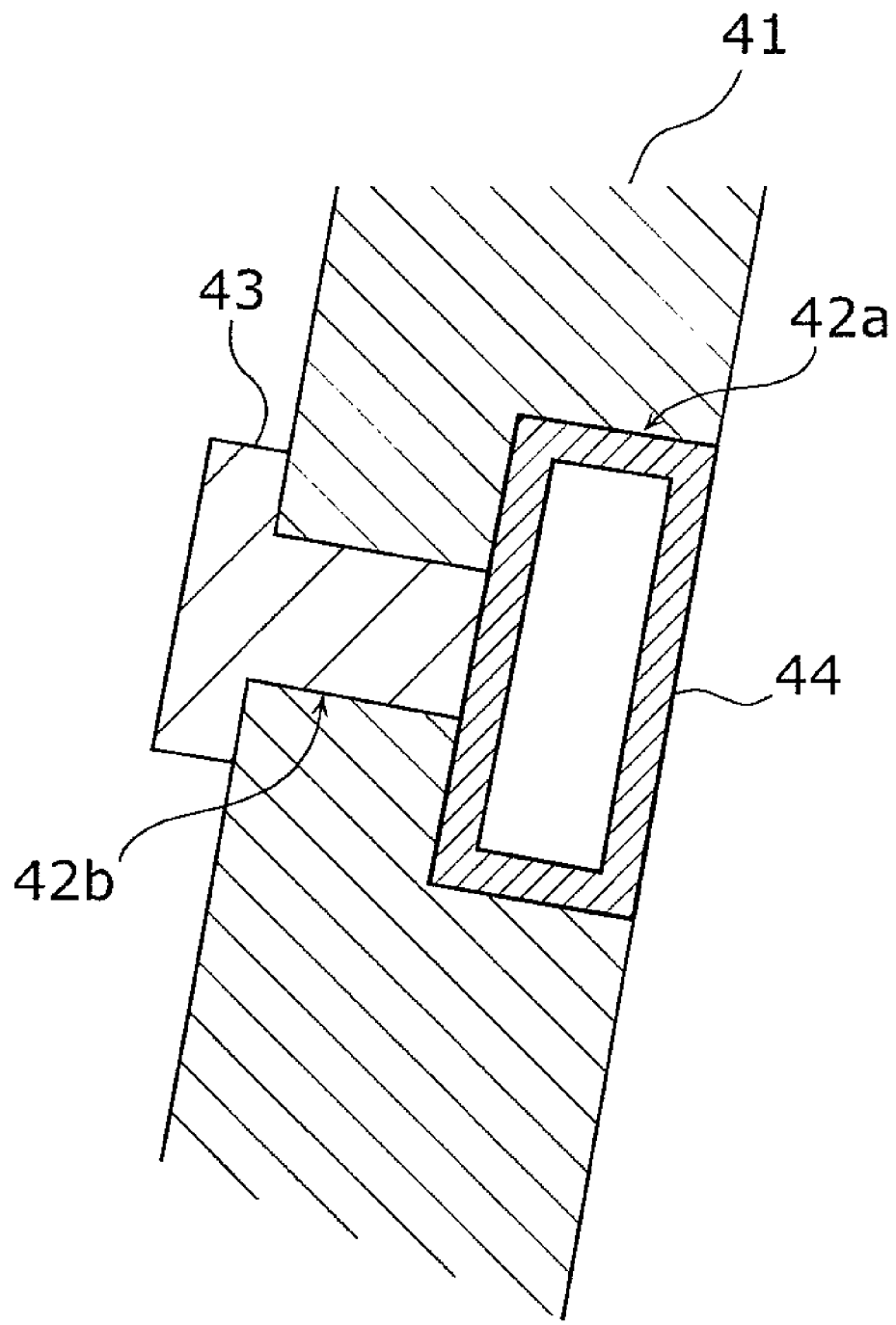
FIG. 14 is an expanded cross-sectional view of a groove and a pullout member formed in the lamp according to Embodiment 4 of the present invention.

FIG. 13 is a front elevational view of the lamp according to Embodiment 4 of the present invention. FIG. 14 is an expanded cross-sectional view of the groove formed in the lamp according to Embodiment 4 of the present invention. Specifically, FIG. 14 is an expanded view of the vicinity of the groove taken along line A4-A4 of FIG. 13. In FIG. 13, constituents which are the same or like as those in FIG. 1 are denoted by the same numerals and are not described.

A case 41 has, on the outer side, a groove 42 in the circumferential direction. The groove 42 is a through groove and includes a first groove portion 42a and a second groove portion 42b.

The first groove portion 42a is formed over the entire circumference of the case 41. Furthermore, the first groove portion 42a has a rectangular cross section.

The second groove portion 42b is formed on the bottom of the first groove portion 42a and has a groove width narrower than a groove width of the first groove portion 42a. The second groove portion 42b is formed partially in the circumferential direction of the case 41. Furthermore, the second groove portion 42b has a rectangular cross section.

A split member 43 is embedded at least in the second groove portion 42b in such a way that the split member 43 is joined to both sides of the second groove portion 42b and can be pulled out.

A pullout member 44 is a member for pulling out the split member 43 from the groove 42 and is embedded in the first groove portion 42a. This pullout member 44 is connected to an end of the split member 43.

The pullout member 44 is a quadrangular tubular member. Specifically, the pullout member 44 has a through hole. This through hole is formed in a groove direction of the groove 42.

Furthermore, the pullout member 44 does not always need to have a quadrangular tubular shape. For example, the pullout member 44 may have a circular tubular shape. In addition, the pullout member 44 does not always need to have a through hole. The pullout member 44 may have any shape that allows a recycling manufacturer to easily pull out the pullout member 44 from the groove 42. For example, the pullout member 44 may have a non-through hole on at least one end. In this case, a recycling manufacturer can hook a tool in this non-through hole and pull out the pullout member 44 from the groove 42.

A disassembling method for the lamp 40 configured as above is the same or like as that for the lamp 30 according to Embodiment 3 and is not described.

As above, since the lamp 40 according to this embodiment includes the split member 43, a recycling manufacturer can split the case 41 by pulling out the split member 43 from the groove, i.e., without using cutting tools. Thus, a recycling manufacturer can easily disassemble the lamp 40.

Furthermore, since the lamp 40 includes the pullout member 44, a recycling manufacturer can pull out the split member 43 from the groove 42 by pulling out the pullout member 44, which further facilitates the disassembling of the lamp 40.

Furthermore, since the pullout member 44 is embedded in the groove 42, the pullout member 44 can be prevented from being too easily pulled out or erroneously pulled out (for example, being caught on something), with the result that the case 41 can be prevented from being split at times other than the time of recycling.

Furthermore, since the pullout member 44 has a hole, a recycling manufacturer can pull out the pullout member 44 by using the hole, which further facilitates the disassembling of the lamp 40.

Embodiment 5

Next, Embodiment 5 of the present invention is described.

A lamp 50 according to this embodiment is different from the lamp 30 according to Embodiment 3 in that a disconnecting unit for disconnecting the power supply line is provided. Accordingly, the following describes the lamp 50 according to this embodiment, mainly differences from the lamp 30 according to Embodiment 3.

Figure 15:
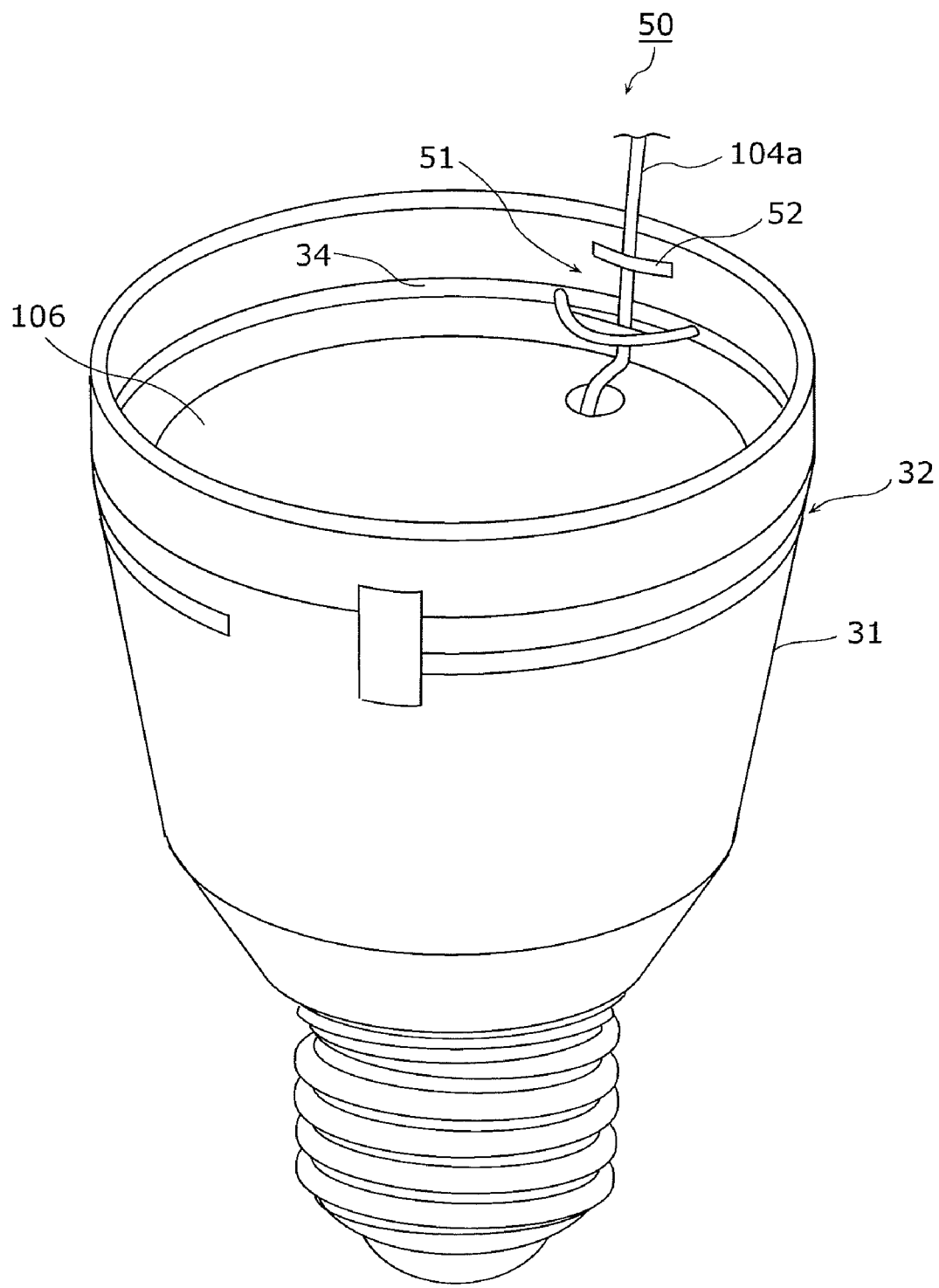
FIG. 15 is a perspective view of a lamp according to Embodiment 5 of the present invention, with a globe, an LED module, and an LED module holder removed.

FIG. 15 is a perspective view of the lamp according to Embodiment 5 of the present invention with a globe, an LED module, and an LED module holder removed.

As shown in FIG. 15, the lamp 50 includes a disconnecting unit 51 and a regulating unit 52 in addition to the constituents included in the lamp 30 according to Embodiment 3.

The disconnecting unit 51 cuts the power supply line 104a upon pulling out of the split member 34. Details of the disconnecting unit 51 will be described later with reference to FIG. 16.

The regulating unit 52 prevents the power supply line 104a from moving toward a blade member 51b. In this embodiment, so as to prevent the power supply line 104a from coming into contact with the blade member 51b during ordinary use, the regulating unit 52 regulates the power supply line 104a so that the power supply line 104a does not move toward the blade member 51b. In this embodiment, the regulating member 52 is an adhesive tape and fixes the power supply line 104a to the inner side of the case 31. It is to be noted that the regulating unit 52 does not always need to be an adhesive tape. For example, the regulating unit 52 may be an adhesive or a groove or the like formed on the inner side of the case 31.

Figure 16:
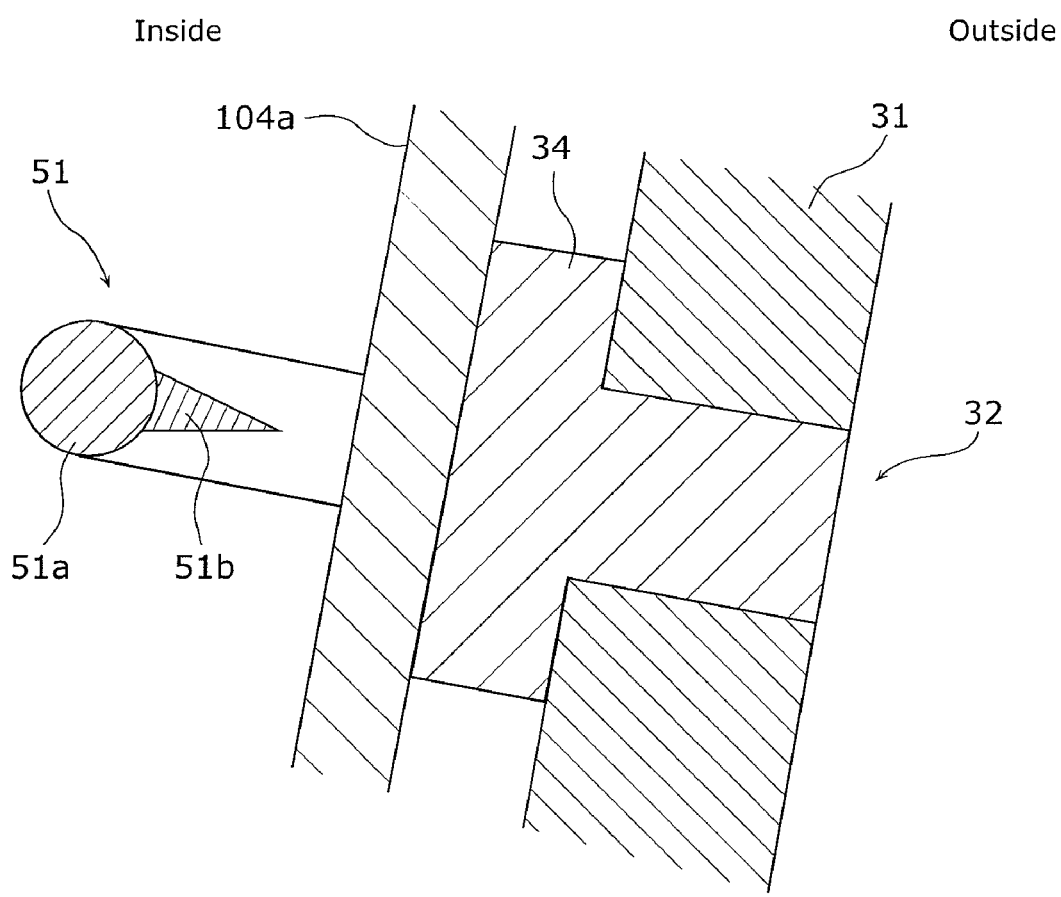
FIG. 16 is an expanded cross-sectional view of a vicinity of a disconnecting unit of the lamp according to Embodiment 5 of the present invention.

FIG. 16 is an expanded cross-sectional view of a vicinity of the disconnecting unit of the lamp according to Embodiment 5 of the present invention. As shown in FIG. 16, the disconnecting unit 51 includes a blade member attachment 51a and a blade member 51b.

The blade member attachment 51a is connected to the split member 34. In this embodiment, the blade member attachment 51a is a string member having both ends physically connected to the split member 34 at different positions.

The blade member 51b is a member having a blade shape, attached to the blade member attachment 51a. The blade member 51b cuts the power supply line 104a upon pressure contact of the power supply line 104a with an edge of the blade shape.

The power supply line 104a is disposed so as to pass between the split member 34 and the blade member 51b. In other words, when the split member 34 is pulled out from the groove 32, the blade member 51b moves toward the power supply line 104a and cuts the power supply line 104a.

As above, since the lamp 50 according to this embodiment includes the disconnecting unit 51, the splitting of the case 31 by the split member 34 accompanies the cutting of the power supply line 104a. Accordingly, the lamp 50 can be prevented from being used after the case 31 is split, which allows improvement in safety.

Furthermore, since the lamp 50 includes the regulating unit 52 which prevents the power supply line 104a from moving toward the blade member 51b, the power supply line 104a can be prevented from being cut by the blade member 51b at times other than splitting of the case 31.

Although the disconnecting unit 51 cuts the power supply line 104a which electrically connects the power supply circuit 104 and the LED module 102 in this embodiment, the disconnecting unit 51 may cut other power supply lines such as a power supply line which electrically connects the base 108 and the power supply circuit 104.

Furthermore, although the disconnecting unit 51 includes the blade member 51b in this embodiment, the disconnecting unit 51 does not always need to include the blade member 51b. For example, the disconnecting unit 51 may include a platy member having a zig-zag side, such as a saw. Alternatively, for example, the disconnecting unit 51 may be a mechanism for simply moving the power supply line 104a and the split member 34 in an integrated manner. In this case, the power supply line 104a is forced to be pulled out together with the split member 34, with the result that the power supply line 104a is cut at a low-strength position such as a connecting part of the power supply line 104a and the LED module 102 or the power supply circuit 104.

Although the lamp according to an implementation of the present invention has been described based on the embodiments, the present invention is not limited to these embodiments. Without departing from the scope of the present invention, the present invention includes an embodiment with some modifications on Embodiments that are conceived by a person skilled in the art, or an embodiment obtained through combinations of the constituents of different Embodiments.

For example, although the groove is formed in the circumferential direction in the above embodiments, the groove does not always need to be formed in the circumferential direction. Furthermore, the position of the groove is not limited to the position indicated in the above embodiments. The direction and position of the groove may be appropriately changed depending on the arrangement of components inside the lamp, the shape of the case, or the like. For example, the groove may be formed in the axial direction.

Furthermore, although the case is metallic in order to efficiently dissipate the heat generated inside in each of the above embodiments, the case does not always need to be metallic.

For example, when the LED module 102 generates less heat or if a resin material or the like having high thermal conductivity will be developed, the case may be made of resin or other material.

Furthermore, although the lamp includes the pullout member in each of Embodiments 3 to 5, the pullout member does not always need to be provided as long as a recycling manufacturer can pull out the split member from the groove. For example, the lamp does not need to include the pullout member in the case where the split member has a small through hole in which a tool can be hooked.

Furthermore, the present invention can not only be implemented as the lamp, but also be implemented as a lighting apparatus which includes the lamp. A lighting apparatus according to an implementation of the present invention is described with reference to FIG. 17.

Figure 17:
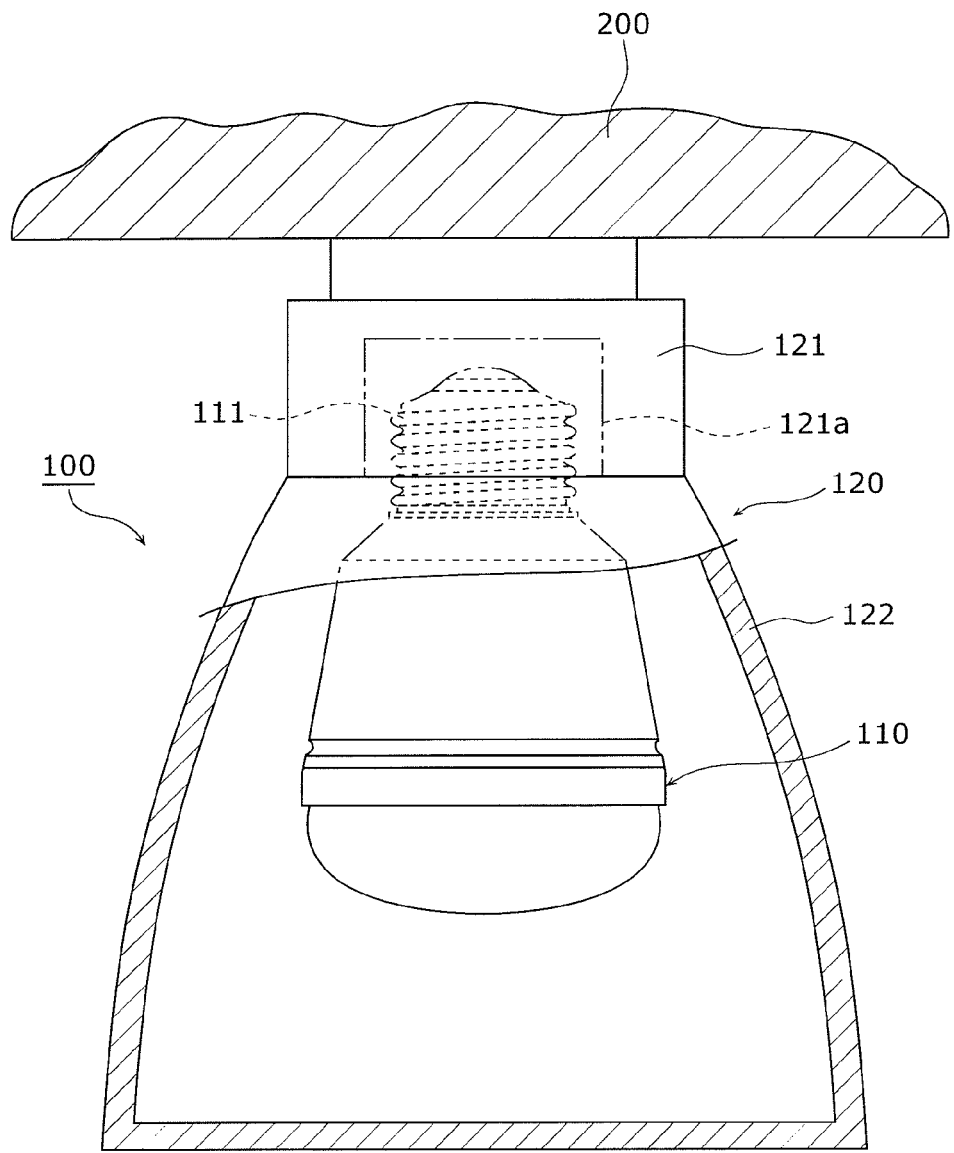
FIG. 17 is a schematic cross-sectional view of a lighting apparatus according to an implementation of the present invention.

FIG. 17 is a schematic cross-sectional view of a lighting apparatus according to an implementation of the present invention.

A lighting apparatus 100 is attached to an indoor ceiling 200 when in use, and includes a lamp 110 and a lighting appliance 120, as shown in FIG. 17, for example. For the lamp 110, the lamp according to each of the above embodiments can be used.

The lighting appliance 120 is to turn on and off the lamp 110 and includes an appliance body 121 which is attached to the ceiling 200, and a lamp cover 122 which covers the lamp 110.

The appliance body 121 includes a socket 121a which is an example of a holding unit. Into the socket 121a, the base 111 of the lamp 110 is screwed. Through this socket 121a, electricity is supplied to the lamp 110.

It is to be noted that the lighting apparatus 100 illustrated herein is an example of a lighting apparatus 100 according to an implementation of the present invention. It is sufficient that, in the lighting apparatus 100 according to an implementation of the present invention, at least the holding unit which holds the lamp is included and through this holding unit, electricity is supplied to the lamp 110. For example, the lighting apparatus 100 may be a lighting apparatus that includes the socket 121a into which the base 111 of the lamp 110 is screwed. Furthermore, although the lighting apparatus 100 shown in FIG. 17 includes one lamp 110, a plurality of the lamps 110 may be provided.

INDUSTRIAL APPLICABILITY

The present invention is useful as a lamp which includes a light source having a semiconductor light-emitting device such as an LED, and as a lighting apparatus which includes the lamp.

REFERENCE SIGNS LIST 10, 20, 30, 40, 50, 110 Lamp
11, 21, 31, 41, Case
12, 22, 32, 42 Groove
22a, 42a First groove portion
22b, 42b Second groove portion
33 Intersecting groove
34, 43 Split member
35, 44 Pullout member
36 Cover member
51 Disconnecting unit
51a Blade member attachment
51b Blade member
52 Regulating unit
100 Lighting apparatus
101 Globe
102 LED module
103 LED module holder
103 Power supply circuit
104a Power supply line
105 Resin case
106 Resin cap
107 Insulating ring
108, 111 Base
120 Lighting appliance
121 Appliance body
121a Socket
122 Lamp cover
200 Ceiling
201 Cutter
202 Tool

The invention claimed is:

1. A lamp comprising:
a case having a certain shape;
a light source including a semiconductor light-emitting device; and
a lighting circuit provided inside said case, for driving said semiconductor light-emitting device to emit light,
wherein on an outer side of said case, a step for splitting said case is formed,
said step is a through groove, and
said lamp further comprises
a split member joined to both sides of said through groove and embedded in said through groove in such a way as to allow said split member to be pulled out,
a power supply line disposed inside said case, for supplying power to said semiconductor light-emitting device; and
a disconnecting unit configured to cut said power supply line when said split member is pulled out.

2. The lamp according to claim 1, further comprising
a pullout member connected to an end of said split member, for pulling out said split member from said through groove.

3. The lamp according to claim 2,
wherein said pullout member is embedded in said through groove, and
said pullout member has a hole formed in a groove direction of said through groove.

4. The lamp according to claim 3,
wherein said through groove includes a first groove portion and a second groove portion formed on a bottom of said first groove portion, said second groove portion having a groove width narrower than a groove width of said first groove portion,
said split member is embedded at least in said second groove portion, and
said pullout member is embedded in said first groove portion.

5. The lamp according to claim 2,
wherein said case further includes an intersecting groove which intersects said through groove, and
said pullout member is embedded in said intersecting groove.

6. The lamp according to claim 5,
wherein said pullout member has a hole formed in a groove direction of said intersecting groove.

7. The lamp according to claim 5, further comprising
a cover member provided so as to cover an opening of said intersecting groove.

8. The lamp according to claim 7,
wherein said cover member is formed by coating said intersecting groove with metal powder.

9. The lamp according to claim 1,
wherein said disconnecting unit includes:
a blade member attachment connected to said split member; and
a blade member having a blade shape attached to said blade member attachment, and
said power supply line is disposed so as to pass between said split member and said blade member.

10. The lamp according to claim 9, further comprising
a regulating unit configured to prevent said power supply line from moving toward said blade member.

11. The lamp according to claim 1,
wherein said step is formed in a circumferential direction of said case.

12. The lamp according to claim 1,
wherein said case is made of a metal.

13. A lighting apparatus comprising:
said lamp according to claim 1; and
a holding unit configured to hold said lamp.

14. A lamp comprising:
a case having a certain shape;
a light source including a semiconductor light-emitting device; and
a lighting circuit provided inside said case, for driving said semiconductor light-emitting device to emit light,
wherein on an outer side of said case, a step for splitting said case is formed, and
said step includes:
a first groove portion formed over an entire circumference of the outer side of said case; and
a second groove portion having a groove width narrower than a groove width of said first groove portion, said second groove portion being formed partially on a bottom of said first groove portion in a circumferential direction of said first groove portion.

15. The lamp according to claim 14,
wherein said case is made of a metal.

16. A lighting apparatus comprising:
said lamp according to claim 14; and
a holding unit configured to hold said lamp.

* * * * *